(12) United States Patent
Nil et al.

(10) Patent No.: US 9,283,867 B2
(45) Date of Patent: Mar. 15, 2016

(54) CONVEYANCE SEAT

(71) Applicant: TOYOTA BOSHOKU KABUSHIKI KAISHA, Aichi-ken (JP)

(72) Inventors: Tomoki Nil, Aichi-ken (JP); Yoshiyuki Murata, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 87 days.

(21) Appl. No.: 14/225,794

(22) Filed: Mar. 26, 2014

(65) Prior Publication Data
US 2014/0290389 A1 Oct. 2, 2014

(30) Foreign Application Priority Data
Mar. 29, 2013 (JP) .................. 2013-070913

(51) Int. Cl.
*G01L 1/04* (2006.01)
*B60N 2/00* (2006.01)
*G01L 1/20* (2006.01)
*B60N 2/70* (2006.01)

(52) U.S. Cl.
CPC ............. *B60N 2/002* (2013.01); *B60N 2/7017* (2013.01); *G01L 1/205* (2013.01)

(58) Field of Classification Search
CPC .............. G01L 1/04; G01L 3/08; G01L 5/06; G01L 3/24; B60R 2021/01516
USPC ....................... 73/862.621, 862.381, 862.321, 73/862.391, 862.471, 862.636, 862
See application file for complete search history.

(56) References Cited

U.S. PATENT DOCUMENTS 7,026,946 B2 * 4/2006 Saunders et al. ............... 340/666
8,198,992 B2 * 6/2012 Fischer et al. ................ 340/438

FOREIGN PATENT DOCUMENTS

| JP | 11-34710 | 2/1999 |
| JP | 2005-112335 | 4/2005 |
| JP | 2007-055490 | 3/2007 |
| JP | 2008-183976 | 8/2008 |

OTHER PUBLICATIONS

Bridgestone, Seat with seating sensor and pad for seat, JP 2005112335.*

* cited by examiner

*Primary Examiner* — Lisa Caputo
*Assistant Examiner* — Nigel Plumb
(74) *Attorney, Agent, or Firm* — Greenblum & Bernstein, P.L.C.

(57) ABSTRACT

A conveyance seat includes: a seating sensor structure including a pressure-sensing portion that is used to detect a pressure, the seating sensor structure being arranged inside a seat pad of the conveyance seat through integral foam-molding. The seating sensor structure is formed by laminating the pressure-sensing portion, a second sheet-shaped member and a first sheet-shaped member in this order from a seating face side. The first sheet-shaped member has a higher stiffness than the seat pad. The second sheet-shaped member has a lower stiffness than the first sheet-shaped member.

3 Claims, 6 Drawing Sheets

CONVEYANCE SEAT

INCORPORATION BY REFERENCE

The disclosure of Japanese Patent Application No. 2013-070913 filed on Mar. 29, 2013 including the specification, drawings and abstract is incorporated herein by reference in its entirety.

BACKGROUND OF THE INVENTION

1. Field of the Invention

The invention relates to a conveyance seat. More specifically, the invention relates to a conveyance seat including a seating sensor.

2. Description of Related Art

There is known a conveyance seat including a seating sensor. The seating sensor is used to detect that an occupant has sit on a seat, and is arranged in a seat cushion. The seating sensor is used to determine whether an occupant is seated on the conveyance seat. For example, the determination result is utilized in order to show an indicator that prompts wearing of a seatbelt or select a seat for which an airbag is inflated. Incidentally, Japanese Patent Application Publication No. 2005-112335 (JP 2005-112335 A) and Japanese Patent Application Publication No. 2008-183976 (JP 2008-183976 A) describe that, in a conveyance seat, a seating sensor is arranged at the lower portion of a seat pad. JP 2008-183976 A describes a technique for foaming urethane resin such that the urethane resin is integrated with the seating sensor. Furthermore, JP 2005-112335 describes that a stiff sheet-shaped member is provided on the upper side or lower side of the seating sensor.

SUMMARY OF THE INVENTION

However, if the seating sensor is arranged at the lower portion of the seat pad, detection of the seating sensor may not appropriately work when the thickness of the seat pad is large. Thus, employment of the configuration that the seating sensor is arranged at the lower portion of the seat pad becomes a factor that reduces the flexibility of seat design. On the other hand, it is conceivable that the seating sensor is provided not at the lower portion of the seat pad but inside or above the seat pad. However, the seating sensor sometimes does not work normally only by arranging the seating sensor inside the seat pad. The reason of this is presumed to be associated with a low stiffness of the seat pad. Therefore, it is also conceivable that a stiff sheet-shaped member is arranged on the seat pad and the seating sensor is arranged on the stiff sheet-shaped member. However, in this case as well, the seating sensor sometimes does not work normally. This is presumed as follows. When the low-stiffness seat pad is present below the stiff sheet-shaped member, the entire stiff sheet-shaped member operates to move downward even when an occupant sits, so the seating sensor sometimes does not work. When the seating sensor is arranged above the seat pad, if a seat cover is made thin, there is a concern about poor appearance like the seating sensor stands out on the surface due to its thickness.

The invention provides a conveyance seat that is able to cause a seating sensor to normally function even when a pad member forming a seat pad is provided below the seating sensor. In addition, the invention further provides a conveyance seat that allows the flexibility of seat design not to decrease even when a seating sensor is arranged.

An aspect of the invention provides a conveyance seat. The conveyance seat includes: a seating sensor structure including a pressure-sensing portion that is used to detect a pressure, the seating sensor structure being arranged inside a seat pad of the conveyance seat through integral foam-molding. The seating sensor structure is formed by laminating the pressure-sensing portion, a second sheet-shaped member and a first sheet-shaped member in this order from a seating face side. The first sheet-shaped member has a higher stiffness than the seat pad. The second sheet-shaped member has a lower stiffness than the first sheet-shaped member.

According to the above aspect, the first sheet-shaped member having a higher stiffness than the seat pad is arranged inside the seat pad, the second sheet-shaped member having a lower stiffness than the first sheet-shaped member is arranged on the seating face side with respect to the first sheet-shaped member and the pressure-sensing portion of the seating sensor is arranged on the seating face side with respect to the second sheet-shaped member, so the seating sensor normally operates even at the time when the seating sensor is pressed from the seating face. This is an advantageous effect that is obtained by a combination of the following two phenomena. That is, the two phenomena are the phenomenon that, because the first sheet-shaped member has a higher stiffness than the seat pad, it is possible to cause a certain supporting force to act such that the seating sensor does not excessively deform at the time of pressing from the seating face toward the seat pad, and, in addition, the phenomenon that, because the second sheet-shaped member having a low stiffness is located on the seating face side with respect to the first sheet-shaped member, the seating sensor is allowed to adequately deform. Because the seating sensor is arranged inside the seat, it is possible to allow the seating sensor to function even when the thickness of the seat is increased, so it is possible to increase the flexibility of seat design.

In the above aspect, the seating sensor structure may be formed such that a third sheet-shaped member is laminated on the seating face side with respect to the pressure-sensing portion, and the first sheet-shaped member and the third sheet-shaped member may be integrally molded with the seat pad.

With the above configuration, because the third sheet-shaped member is arranged on the seating face side with respect to the seating sensor and the first sheet-shaped member and the third sheet-shaped member are formed integrally with the seat pad, it is possible to arrange the seating sensor at the time of foam-molding the seat pad, so it is possible to arrange the seating sensor at an appropriate position. Because of the first to third sheet-shaped members, it is possible to suppress the possibility of breakage of the seating sensor due to heat even at the time of foam-molding. Because the third sheet-shaped member and the pad member are located between the seating face of the seat and the seating sensor, the appearance of the seating sensor does not appear on the seating face of the seat, so it is possible to increase the flexibility of designing the seat shape of the seating face.

In the above configuration, the third sheet-shaped member may have a lower stiffness than the seat pad and may have a higher stiffness than the second sheet-shaped member.

With the above configuration, because the third sheet-shaped member has a lower stiffness than the pad member, the third sheet-shaped member is able to deform so as to follow a deformation of the pad member located on the seating face side with respect to the third sheet-shaped member and has a higher stiffness than the second sheet-shaped member, it is possible to suppress pressing with an excessively large face or pressing with an excessively small face at the time of pressing the seating sensor, so it becomes easy to appropriately press the seating sensor.

According to the aspect of the invention, even when the pad member that forms the seat pad is provided below the seating sensor, it is possible to cause the seating sensor to normally function.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
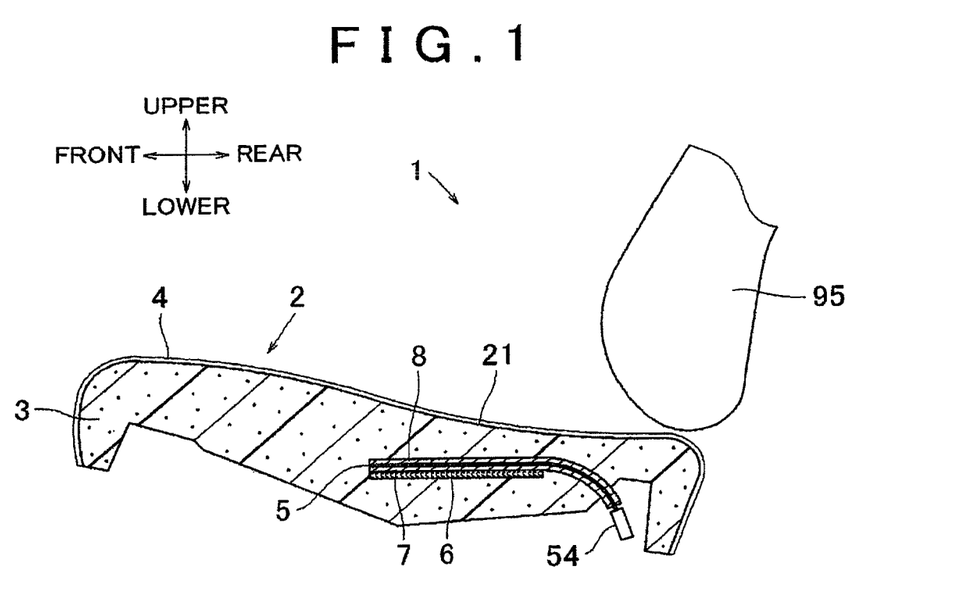
FIG. 1 is a cross-sectional view of a conveyance seat in which a seating sensor is arranged inside a seat pad.

Hereinafter, an embodiment of the invention will be described with reference to the accompanying drawings. Directions, such as upper and lower directions and front and rear directions, in the description indicate directions in an occupant's seated position state as shown in FIG. 1. A conveyance seat 1 according to the present embodiment is the conveyance seat 1 in which a seating face 21 of a seat pad 3 is covered with a seat cover 4, and is the conveyance seat 1 in which the seat pad 3 and the seat cover 4 are integrated with each other. In the conveyance seat 1, a seating sensor 5 is arranged inside the seat pad 3, and a conveyance according to the present embodiment is a vehicle.

Figure 2:
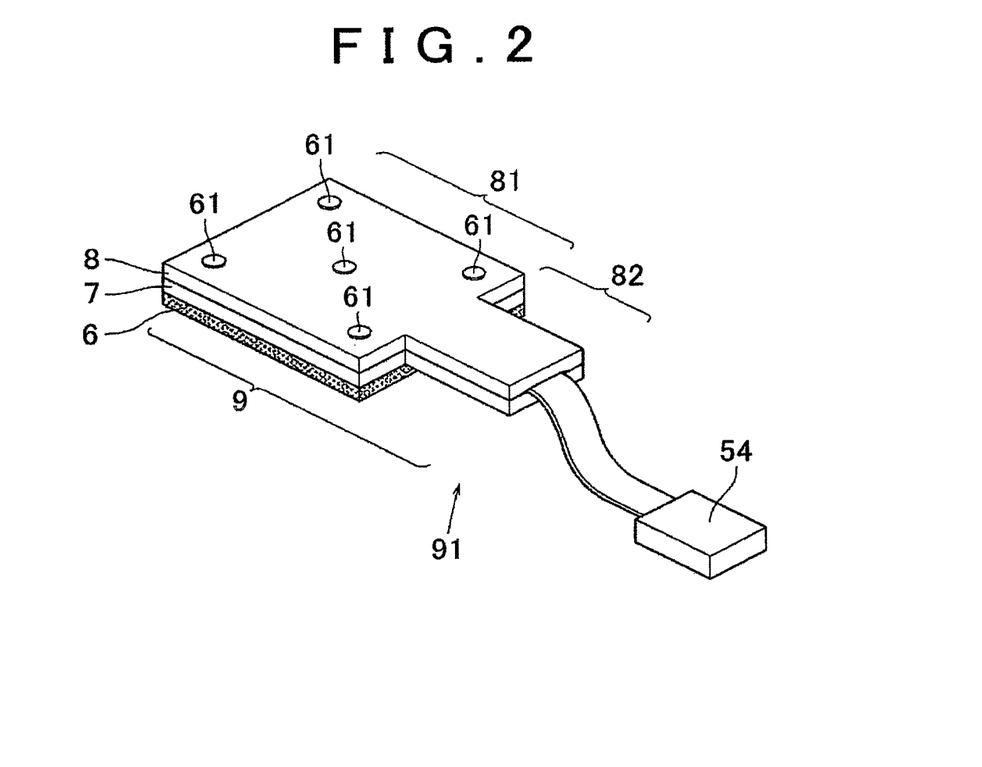
FIG. 2 is a view that shows a state where the seating sensor is arranged in a laminated member.
Figure 3:
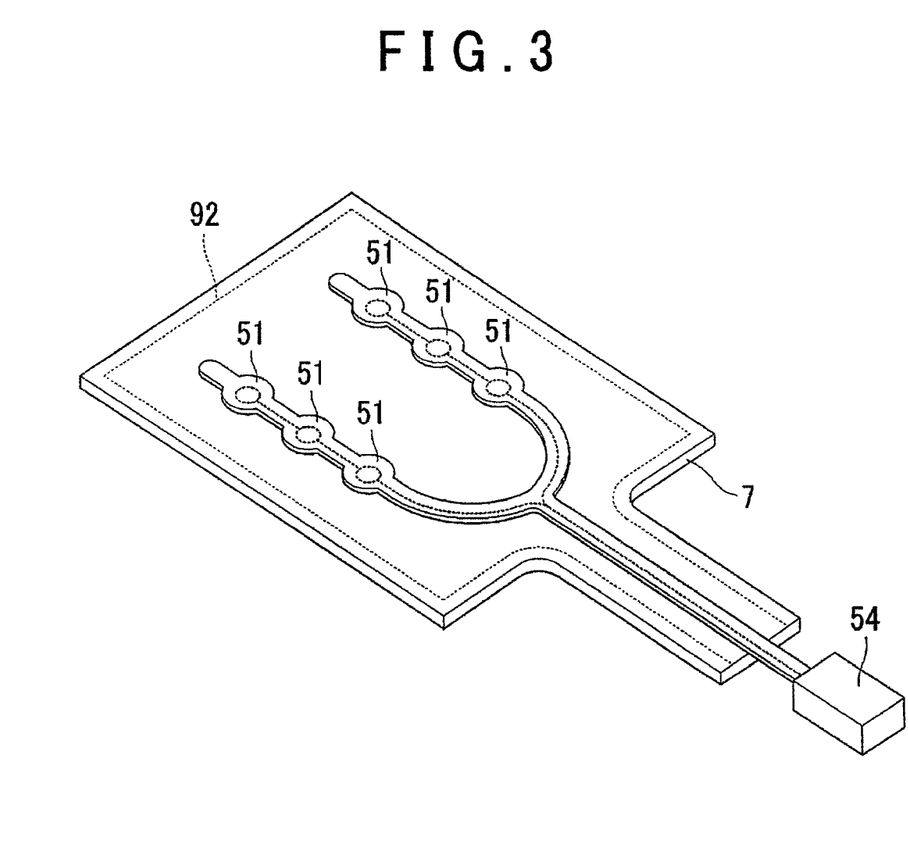
FIG. 3 is a perspective view that shows a state where the seating sensor is arranged on a second sheet-shaped member.

The conveyance seat 1 according to the present embodiment is configured such that the seating sensor 5 is arranged inside the seat pad 3 that is solidified by foaming urethane raw liquid 71. The seating sensor 5 is sandwiched by a slab member that is a third sheet-shaped member 8 and a slab member that is a second sheet-shaped member 7. Specifically, the third sheet-shaped member 8 is a slab member having a lower stiffness than the seat pad 3. The second sheet-shaped member 7 is a slab member having a lower stiffness than the third sheet-shaped member 8. As shown in FIG. 2, the third sheet-shaped member 8 has a substantially rectangular plane portion 81, and also has a strap portion 82 continuously connected from the plane portion 81 and smaller in the width direction than the plane portion 81. The second sheet-shaped member 7 has substantially the same shape as the third sheet-shaped member 8. As shown in FIG. 3, a hot melt resin 92 is arranged on one side of the second sheet-shaped member 7 along its outer periphery. The second sheet-shaped member 7 and the third sheet-shaped member 8 are bonded to each other with the use of the hot melt resin 92 to form a pouch shape. Pressure-sensing portions 51 of the seating sensor 5 are arranged between the plane portion 81 of the third sheet-shaped member 8 and the plane portion 81 of the second sheet-shaped member 7, which are formed in a pouch shape. The seating sensor 5 is not fixedly bonded to the third sheet-shaped member 8 or the second sheet-shaped member 7, and is allowed to freely move by a certain amount. This is because, if the seating sensor 5 is bonded to the second sheet-shaped member 7 or the third sheet-shaped member 8, the seating sensor 5 may be hard to deform, the seating sensor 5 may not appropriately work or the seating sensor 5 may break. The strap portion 82 of the second sheet-shaped member 7 and the strap portion 82 of the third sheet-shaped member 8 are arranged so as to cover a portion that connects the pressure-sensing portions 51 to a connector 54 in the seating sensor 5. The strap portion 82 of the second sheet-shaped member 7 and the entire third sheet-shaped member 8 are provided for the purpose of not causing the seating sensor 5 to contact urethane foam while the urethane raw liquid 71 is being foamed. Therefore, the end portion of the strap portion 82 is located so as to protrude from the foamed seat pad 3. A first sheet-shaped member 6 is connected to the other face of the second sheet-shaped member 7. The first sheet-shaped member 6 is made of a freestanding felt material, and has a higher stiffness than the seat pad 3. The first sheet-shaped member 6 has substantially the same shape as the plane portion 81 of the second sheet-shaped member 7. The first sheet-shaped member 6, the second sheet-shaped member 7 and the third sheet-shaped member 8 are integrated to constitute a laminated member 9.

In the present embodiment, the first sheet-shaped member 6 that constitutes the laminated member 9 is located inside the seat pad 3. The fact that the laminated member 9 is located inside also means that the laminated member 9 is located on the seating face 21 side with respect to part of a pad member. In other words, a structure is such that the second sheet-shaped member 7 is arranged so as to be in close contact with the upper face of the first sheet-shaped member 6, the third sheet-shaped member 8 is arranged so as to be in close contact with the second sheet-shaped member 7 and the pad member that constitutes the seat pad 3 is located around the laminated member 9 formed of the first sheet-shaped member 6, the second sheet-shaped member 7 and the third sheet-shaped member 8. The seating sensor 5 is arranged between the second sheet-shaped member 7 and the third sheet-shaped member 8 that constitute the laminated member 9. A component in which the seating sensor 5 is arranged in the laminated member 9 is a seating sensor structure 91 according to the present embodiment.

Figure 5:
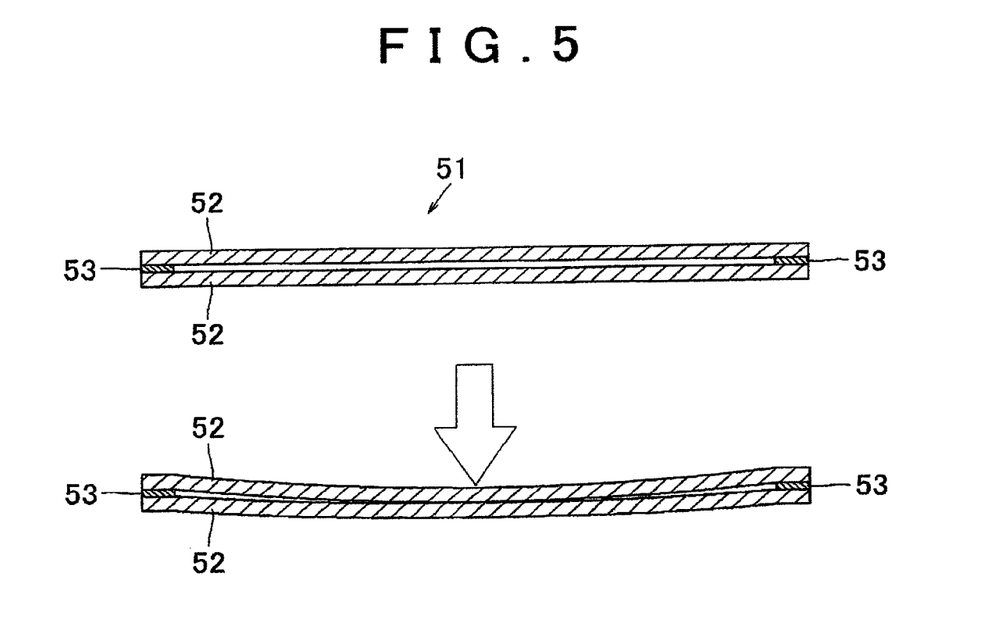
FIG. 5 is a view that shows a state before a pressure-sensing portion of the seating sensor deforms and a state after the pressure-sensing portion has deformed.

As shown in FIG. 5, the seating sensor 5 is configured to include two sensor seats 52 having energizable portions. The two sensor seats 52 are arranged so as not to be in contact with each other. Portions that allow the sensor seats 52 to contact with each other through bending are provided at positions set as needed within the seating sensor 5. These portions correspond the pressure-sensing portions 51. When the mutual sensor seats 52 contact with each other at any one of the pressure-sensing portions 51, the sensor seats 52 are placed in an electrically connected state. At each pressure-sensing portion 51, the two sensor seats 52 are supported by a spacer 53, and a space is formed on the inner side of the spacer 53 (see FIG. 5). For example, when a certain load is applied vertically downward, one of the sensor seats 52 deforms. As a result, the one of the sensor seats 52 enters the space formed on the inner side of the spacer 53, and the mutual sensor seats 52 contact with each other (see FIG. 5). That is, in the seating sensor 5 according to the present embodiment, it is required in detection of seating that the two sensor seats 52 arranged at a distance from each other by the spacer 53 are brought into contact with each other due to a load applied to the seating sensor 5.

Figure 4:
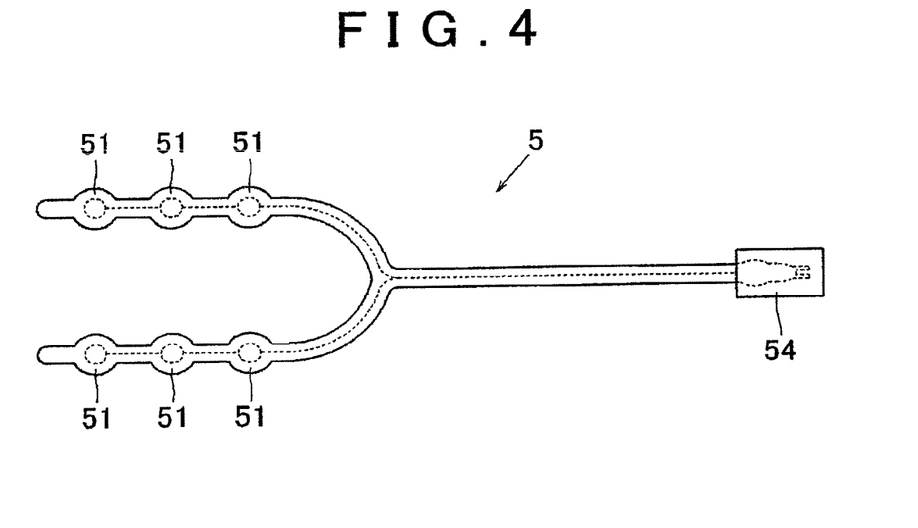
FIG. 4 is a plan view of the seating sensor.

The seating sensor 5 can have various shapes, such as an I shape and a Y shape. The seating sensor 5 of any shape usually includes the three or more pressure-sensing portions 51. The number of the pressure-sensing portions 51 is various numbers, such as four, five and more than five. In the present embodiment, the six pressure-sensing portions 51 are provided as shown in FIG. 4. The six pressure-sensing portions 51 and the connector 54 are connected in a Y shape. The pressure-sensing portions 51 are arranged at a distance from each other, so at which pressure-sensing portion 51 the sensor seats 52 are brought into contact with each other depends on a mode of a load applied to the conveyance seat 1. Only when the sensor seats 52 are in contact with each other at a predetermined combination of the specific pressure-sensing portions 51, the sensor seats 52 are placed in an energizable state. Therefore, when the sensor seats 52 contact with each other at one pressure-sensing portion 51 or when the sensor seats 52 contact with each other at all the pressure-sensing portions 51, the sensor seats 52 are not placed in the energizable state, and seating is not detected. This is because it makes it possible to distinguish a load that is applied through putting of a small baggage or a large baggage from a load that is applied through seating.

The seating sensor 5 is configured as described above, so, when an occupant sits on the conveyance seat 1, the sensor seats 52 need to appropriately contact with each other. For this purpose, the first sheet-shaped member 6 has a higher stiffness than the seat pad 3. The second sheet-shaped member 7 has a lower stiffness than the first sheet-shaped member 6. By employing the above configuration, the detection accuracy of the seating sensor 5 increases. This is due to the configuration that the seating sensor 5 is adequately supported by the first sheet-shaped member 6 and the portions at which the seating sensor 5 is easily deformable are provided on the seating sensor 5 side with respect to the first sheet-shaped member 6.

The seating sensor 5 is electrically connected to a harness (not shown) via the connector 54. The connector 54 is provided at a portion exposed from the end portion of the pouch shape formed by the second sheet-shaped member 7 and the third sheet-shaped member 8. The harness is arranged at the rear lower portion of the conveyance seat 1. An energization situation of the seating sensor 5 is acquired as information into a control device (not shown) via the harness, and determination as to whether an occupant has sit is carried out in the control device.

Figure 7:
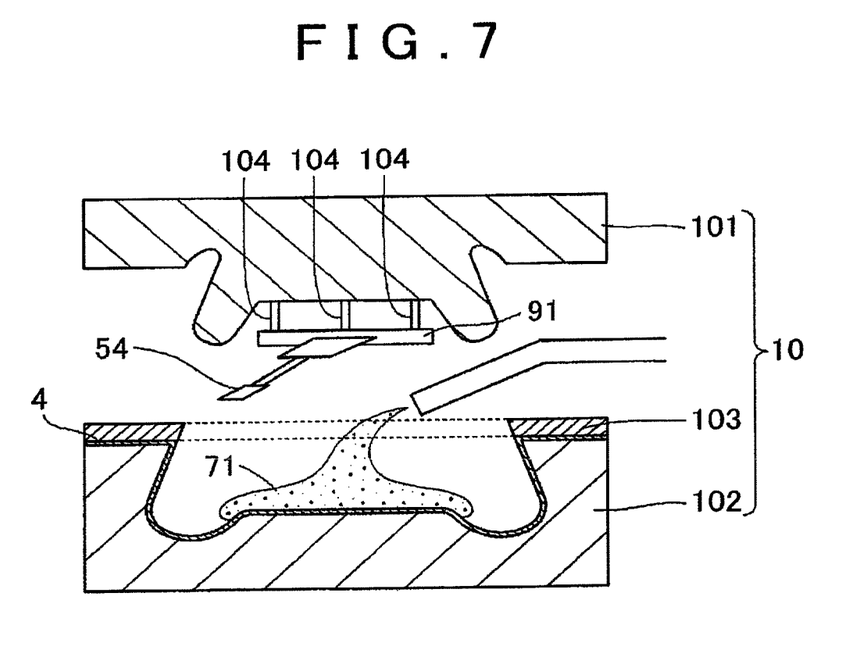
FIG. 7 is a conceptual view that shows a state where urethane raw liquid is poured into a space surrounded by the seat cover.
Figure 8:
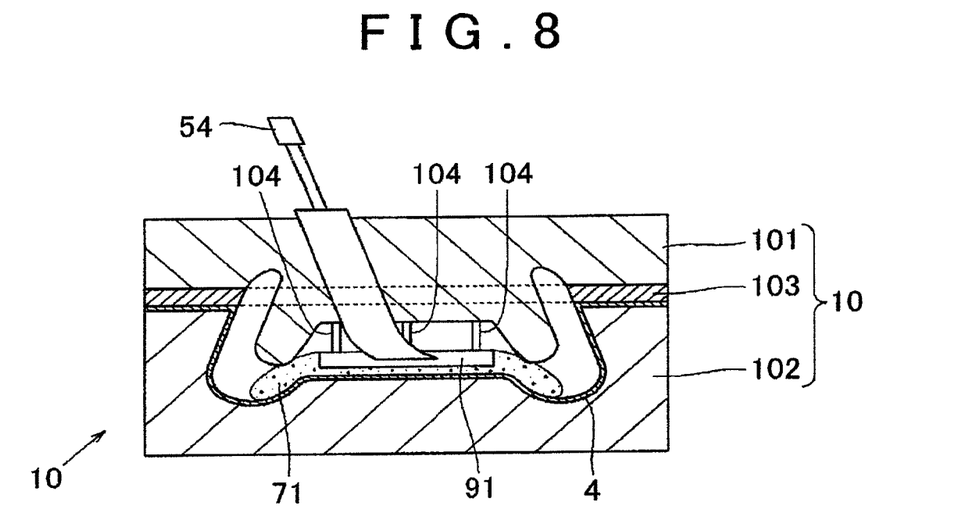
FIG. 8 is a conceptual view that shows a state before urethane raw liquid foams inside the foaming die.
Figure 9:
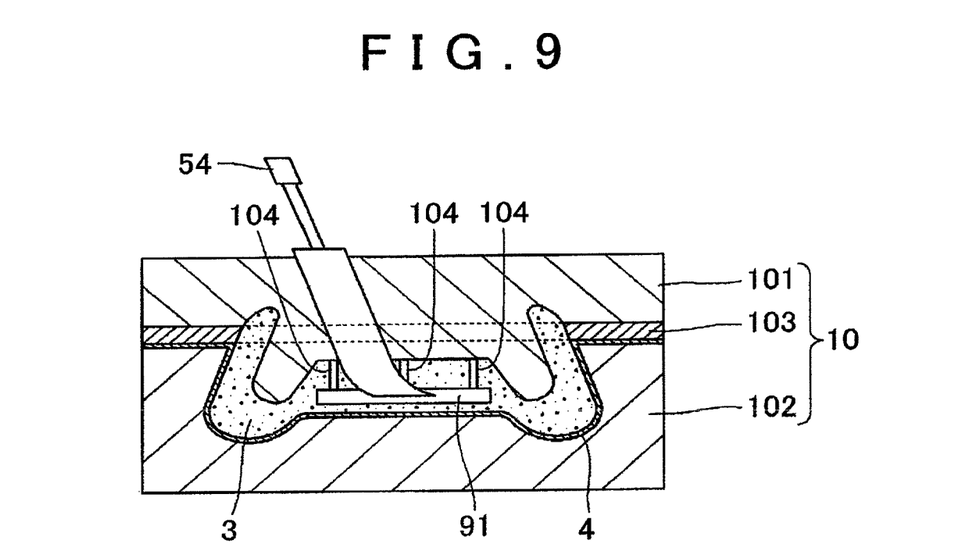
FIG. 9 is a conceptual view that shows a state at the time when urethane raw liquid has foamed inside the foaming die.
Figure 10:
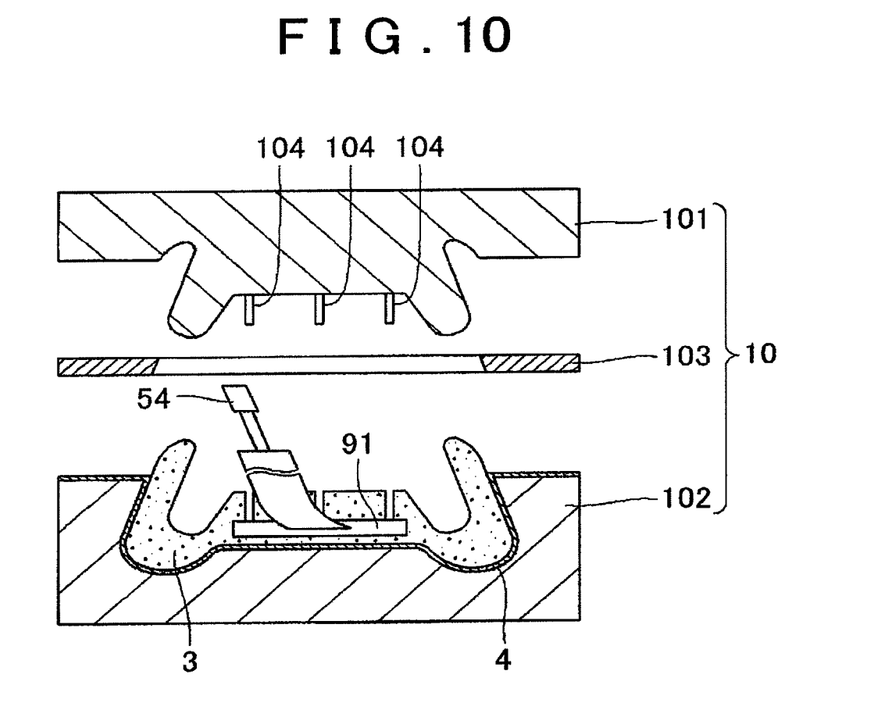
FIG. 10 is a conceptual view that shows a state where a cope and a core in the foaming die are removed.

Next, although a method of manufacturing the conveyance seat 1 will be described, a foaming die 10 that is used to form the seat pad 3 will be simply described first. Here, urethane is foam-molded with the use of the foaming die 10 including a cope 101, a drag 102 and a core 103. A plurality of set pins 104 extending toward the drag 102 are provided in the cope 101. The set pins 104 are used to support the seating sensor structure 91. As shown in FIG. 2, magnets 61 are provided in the seating sensor structure 91, so the magnets 61 are able to adhere to the distal ends of the set pins 104. Thus, the seating sensor structure 91 is allowed to be held in a state of being hoisted by the cope 101 (see FIG. 7). The length of each set pin 104 is set such that the seating sensor structure 91 is arranged without contacting with the bottom face of the drag 102 at the time when the cope 101 is closed. At this time, the distance between the seating sensor structure 91 and the bottom face of the drag 102 is a clearance of about 1 cm. This is because, if the clearance between the bottom face of the drag 102 and the seating sensor structure 91 is too narrow, the urethane raw liquid 71 may not be sufficiently foam-molded between the seating sensor structure 91 and the bottom face of the drag 102 and an unexpected underfill portion may occur between the seat cover 4 and the seating sensor structure 91. A clearance larger than or equal to the above is also allowed; however, in consideration of high sensitivity of the seating sensor 5, it is desirable that the clearance be up to about 3 cm. At the time when the urethane raw liquid 71 is poured into the drag 102, the urethane raw liquid 71 is located near the bottom face. At the time when the urethane raw liquid 71 is foamed, the foam inflates from the bottom face of the drag 102 toward the cope 101, so urethane more easily goes round into a gap formed between the foaming die 10 and the seating sensor structure 91 in the case where the seating sensor structure 91 is arranged near the bottom face of the drag 102 than in the case where the seating sensor structure 91 is arranged near the cope 101. Therefore, occurrence of an underfill is more easily suppressed in the case where the seating sensor structure 91 is arranged near the bottom face of the drag 102. The drag 102 is a die in which the seat cover 4 is arranged along the inner face, and is a vessel-shaped die into which the urethane raw liquid 71 is poured. The core 103 serves to fix the seat cover 4, arranged in the drag 102, by sandwiching the seat cover 4 with the drag 102. The core 103 is open at its center portion, and has such a structure that only a frame is provided. The urethane raw liquid 71 is allowed to be poured through the open portion. The open portion is also a portion that will be closed by the cope 101.

Figure 6:
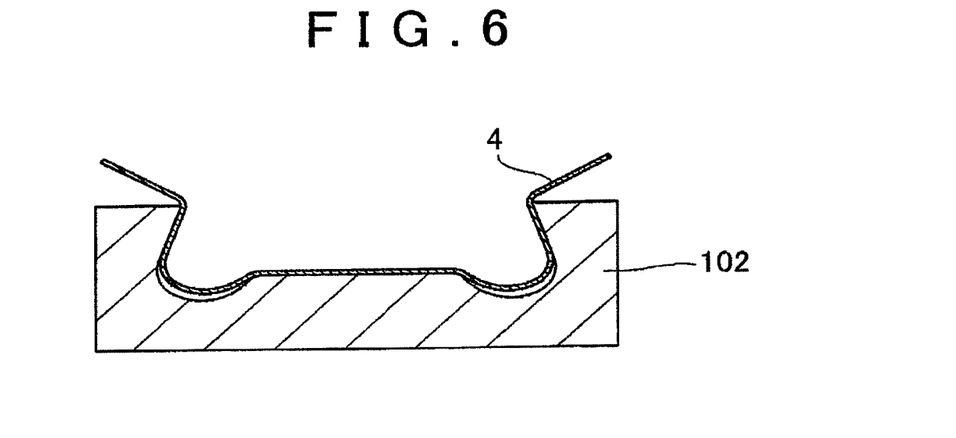
FIG. 6 is a conceptual view that shows a state where a seat cover is set in a foaming die.
Figure 11:
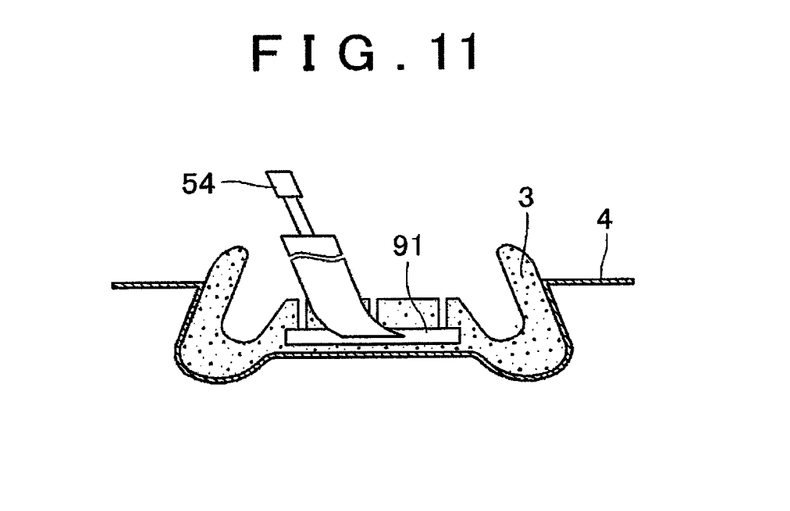
FIG. 11 is a conceptual view of a molded product taken out from the foaming die.

As shown in FIG. 6, the seat cover 4 is set along the inner face of the vessel-shaped drag 102. At this time, the seat cover 4 is set such that the seating face 21 of the seat cover 4 faces the inner face of the drag 102. Because setting of the seat cover 4 requires utmost care, the seat cover 4 is set so as to be in close contact with the drag 102 by hand. After the seat cover 4 is set to the drag 102, the core 103 is laid over the drag 102 such that the frame shape is located along the periphery of the drag 102. By laying the core 103 on the drag 102 so as to be located along the periphery of the drag 102, the seat cover 4 is firmly fixed to the drag 102 (see FIG. 7). Thus, it is possible to prevent misalignment of the seat cover 4 during the following work. In this state, the two-liquid mixed urethane raw liquid 71 is poured onto the seat cover 4 (see FIG. 7). At the time when the urethane raw liquid 71 is poured, in order to pour the urethane raw liquid 71 in a state of being isolated from a worker, actually, the foaming die 10 moves as the worker presses a pushbutton, and the urethane raw liquid 71 is poured at a moved destination. Because the seat cover 4 is fixed by the drag 102 and the core 103, it is possible to suppress misalignment of the seat cover 4 even at the time when the foaming die 10 moves. After an adequate amount of the urethane raw liquid 71 is poured onto the seat cover 4, the cope 101 is closed (see FIG. 8). The terminal of the seating sensor 5 is arranged so as to be located on the outer side of the foaming die 10 together with the terminals of the second sheet-shaped member 7 and third sheet-shaped member 8. In FIG. 7 to FIG. 10, the terminal of the seating sensor 5 is located so as to extend to the near side in the drawings. Because the drawings are cross-sectional views, the drawings do not sufficiently show how the terminal of the seating sensor 5 is located on the outer side of the foaming die 10; however, actually, the terminal of the seating sensor 5 is arranged so as to protrude from between the core 103 and the cope 101. It is also allowed to cause the seating sensor 5 to protrude from between the core 103 and the drag 102. It is allowed to determine as needed how the terminal of the seating sensor 5 is located on the outer side of the foaming die 10. The urethane raw liquid 71 is heated so as to foam in a state where the open portion of the core 103 is closed by the cope 101, thus causing a chemical reaction. By foaming the urethane raw liquid 71 to be inflated, urethane is filled in the foaming die 10, and is solidified (see FIG. 9). After urethane is filled in the foaming die 10, the urethane is cooled, and the cope 101 is removed. At the time when the cope 101 is removed, the set pins 104 are removed from the seating sensor structure 91 (see FIG. 10). This is because, although the set pins 104 and the seating sensor structure 91 adhere to each other, the seating sensor structure 91 is not allowed to move together with the set pins 104 due to the presence of the foam-molded solid urethane. After that, the core 103 is removed, and, furthermore, an urethane molded member is taken out from the foaming die 10 (see FIG. 11). Through the above-described series of processes, a seat cushion 2 in which the seating sensor 5 is arranged inside the seat pad 3 integrated with the seat cover 4 is completed. By assembling the seat cushion 2 to a seat frame as usual and mounting the other portions, such as a seat back 95, the conveyance seat 1 is completed.

With the conveyance seat 1 and the method of manufacturing the conveyance seat 1 according to the present embodiment, the following advantages are obtained. With the conveyance seat 1 according to the present embodiment, even when the seating sensor 5 is provided inside the seat pad 3, the seating sensor 5 is able to appropriately deform, so the seating sensor 5 normally works. Because the seating sensor 5 is not arranged on the upper face of the seat pad 3, the shape of the seating sensor 5 does not stand out on the surface even when the thickness of the seat cover 4 is reduced, so it is possible to impart flexibility to selection of the seat cover 4 that forms the seating face 21. The seating sensor 5 is arranged inside the seat pad 3, so it is possible to make seat design that provides thickness to the seat cushion 2. Because the seating sensor 5 is arranged on the second sheet-shaped member 7 and then the second sheet-shaped member 7 and the third sheet-shaped member 8 are arranged and bonded, it becomes easy to set the seating sensor 5 at a specified position, with the result that it is possible to maintain the accuracy that the seating sensor 5 functions. It is not the case where the second sheet-shaped member 7 and the third sheet-shaped member 8 are formed into a pouch shape and then the seating sensor 5 is inserted into the pouch-shaped member, so the seating sensor 5 is easily appropriately arranged at an intended position. Thus, it is possible to suppress occurrence of poor detection due to arrangement of the seating sensor 5 at an inappropriate position. Because the felt material is used to form the first sheet-shaped member 6, it is possible to suppress a feeling of foreign substance that arises in the case where an iron plate is used as the first sheet-shaped member 6. Because the felt material also has a freestanding stiffness, even at the time when the urethane raw liquid 71 foams, the felt material is less likely to change its shape as it is pushed by the flowing urethane, so it is easy to arrange the seating sensor structure 91 at a desired position. With the seat pad 3 formed in the mode of the above-described embodiment, an unnecessary hole, groove, or the like, is not formed at the seating face 21 side, so a seating feel is not deteriorated.

The embodiments are described above; however, the invention may be implemented in various other forms other than the above-described embodiments. For example, the seating sensor does not need to be arranged inside the seat pad, and may be arranged on the upper face of the seat pad. In this case, it is allowed not to provide the third sheet-shaped member. In the present embodiment, the seat cover and the seat pad are integrally molded; instead, it is allowed not to integrally mold the seat cover and the seat pad with each other. The timing at which the urethane raw liquid is poured may be not before the cope is closed. The urethane raw liquid may be poured through an inlet provided at a certain location after the cope is closed. The seating sensor does not need to be a seating sensor that uses the sensor seat, and may be another seating sensor. The second sheet-shaped member and the third sheet-shaped member each do not need to have both a principal face portion and a strap portion narrower in width than the principal face portion; instead, each of the second sheet-shaped member and the third sheet-shaped member may have a substantially rectangular shape or may have another shape. The resin that is used in foam-molding does not need to be urethane, and another known resin may be employed. The conveyance is not limited to the vehicle; and may be a conveyance that flies in the air or a conveyance that moves on the sea, in the sea, or the like.

What is claimed is:

1. A conveyance seat comprising:
a seating sensor structure including a pressure-sensing portion to detect a pressure, the seating sensor structure being arranged inside a seat pad of the conveyance seat through integral foam-molding such that an upper surface and a lower surface of the seating sensor structure face the seat pad, the seating sensor structure located on a seating face side with respect to a portion of the seat pad, wherein
the seating sensor structure includes the pressure-sensing portion, a second sheet-shaped member and a first sheet-shaped member, laminated together, in this order from a seating face side,
the first sheet-shaped member has a higher stiffness than the seat pad, and
the second sheet-shaped member has a lower stiffness than the first sheet-shaped member.

2. The conveyance seat according to claim 1, wherein
the seating sensor structure is formed such that a third sheet-shaped member is laminated on the seating face side with respect to the pressure-sensing portion, and
the first sheet-shaped member and the third sheet-shaped member are integrally molded with the seat pad.

3. The conveyance seat according to claim 2, wherein
the third sheet-shaped member has a lower stiffness than the seat pad and has a higher stiffness than the second sheet-shaped member.

* * * * *